June 30, 1964 B. F. LOGAN, JR., ETAL 3,139,487

BANDWIDTH REDUCTION SYSTEM

Filed Dec. 27, 1960

2 Sheets-Sheet 1

INVENTORS: B. F. LOGAN, JR.
A. J. PRESTIGIACOMO

BY C. E. Hirsch Jr.

ATTORNEY

June 30, 1964 B. F. LOGAN, JR., ETAL 3,139,487

BANDWIDTH REDUCTION SYSTEM

Filed Dec. 27, 1960 2 Sheets-Sheet 2

INVENTORS B. F. LOGAN, JR.
A. J. PRESTIGIACOMO

BY G. E. Hirsch Jr.
ATTORNEY

United States Patent Office 3,139,487
Patented June 30, 1964

3,139,487
BANDWIDTH REDUCTION SYSTEM

Benjamin F. Logan, Jr., Summit, and Anthony J. Prestigiacomo, North Plainfield, N.J., assignors to Bell Telephone Laboratories, Incorporated, New York, N.Y., a corporation of New York Filed Dec. 27, 1960, Ser. No. 78,660
7 Claims. (Cl. 179—15.55)

Figure 1:
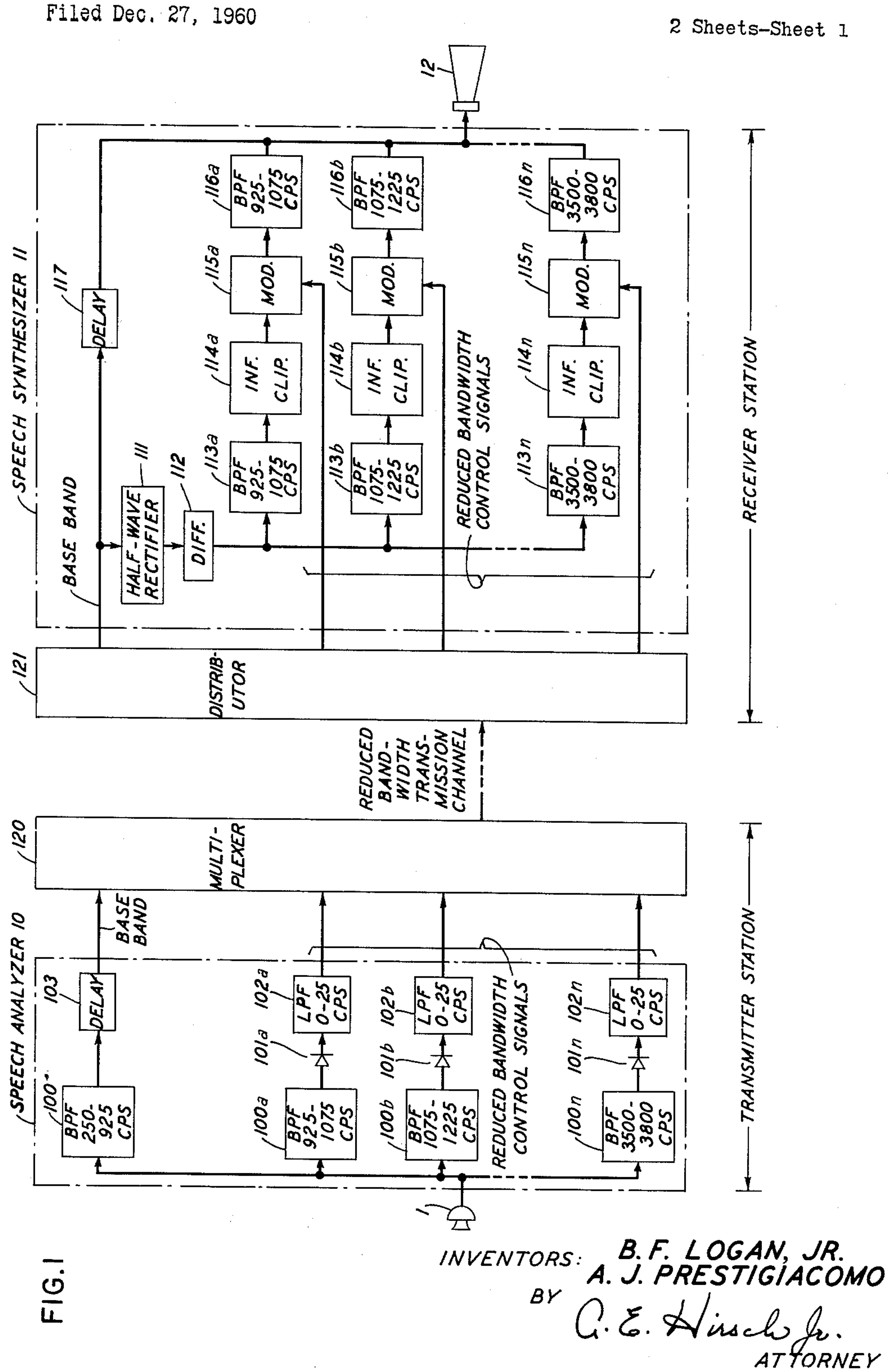

This invention relates to the transmission of reduced bandwidth speech signals, and particularly to the reduced bandwidth transmission of telephone quality speech signals.

The frequency components of typical human speech sounds lie in a range that extends from about 80 cycles per second to 10,000 cycles per second, but economic considerations require that the bandwidth of telephone transmission channels be limited to a standard frequency range extending from about 200 cycles per second to 3,800 cycles per second. Unmodified transmission of speech over a standard telephone channel therefore involves the loss of many speech components, but despite the loss of components, so-called telephone quality speech signals are highly intelligible and are sufficiently natural sounding for voice of a particular talker to be identified.

Many systems have been proposed, however, for modifying speech signals before transmission in order to achieve a more effective utilization of the limited bandwidth of standard telephone channels, either through an improvement in the quality of the transmitted speech signals or through a reduction in the bandwidth of telephone quality speech signals. An example of a system for improving the quality of speech transmitted over standard telephone channels is the voice-excited vocoder, a description of which is found in a patent application of M. R. Schroeder, Serial No. 774,173, filed November 17, 1958, now matured into Patent 3,030,450, issued April 17, 1962, and in an article entitled "A Vocoder for Transmitting 10 kc./s. Speech Over a 3.5 kc./s. Channel," by M. R. Schroeder and E. E. David, Jr., volume 10, No. 1, Acustica, page 35 (1960). The Schroeder system divides the frequency components of a high quality speech signal, of 10,000 cycles per second bandwidth, into two portions: a band of low-frequency components and a band of high-frequency components. The band of low-frequency components, or base band, which is typically about 2,000 cycles per second in width, is not modified before transmission, but the band of high-frequency components is modified by subdividing it into several relatively broad sub-bands, and by deriving from each sub-band a reduced bandwith control signal representative of the amplitudes of the components in each sub-band. The control signals are transmitted together with the unmodified base band over a standard telephone channel to a receiver station, where a broad band of high-frequency components with relatively uniform amplitudes is generated from the base band. This broad band of components is used as a common excitation signal which is modulated by the control signals to reconstruct a replica of the high-frequency components of the original speech signal, and the reconstructed high-frequency components are combined with the base band to synthesize a speech signal whose quality closely approximates that of the original speech signal and is superior to the quality of speech transmitted in unmodified form over a standard telephone channel. The quality of the speech produced by the Schroeder system is due in large part to the use of the base band of the original signal to generate a common excitation signal for the reconstruction of high-frequency components, thereby preserving the characteristics of the original speech signal in the reconstruced components.

An example of a system belonging to the second category, that is, systems for reducing the bandwidth of telephone quality speech signals, is the semi-vocoder of C. B. H. Feldman, described in Patent 2,817,711, issued December 24, 1957. Systems belonging to this category, however, have found relatively limited application because the reduction in bandwidth of telephone quality speech signals has been accompanied by a detectable loss of quality in the transmitted signals.

It is an object of the present invention to reduce the bandwidth of telephone quality speech signals with a negligible loss of quality.

In the present invention, an incoming telephone quality speech signal is divided into two parts: a relatively wide band of high-frequency components; and a relatively narrow band of low-frequency components whose width is sufficient to contain accurate information regarding the fundamental pitch frequency of a wide range of human voices. The band of low-frequency components, also referred to as the base band, is transmitted without modification to a receiver station. The band of high-frequency components, however, is transmitted in modified form as a group of reduced bandwidth control signals: the band of high-frequency components is subdivided into a large number of narrow, contiguous subbands in order to define the individual components with accuracy, and from each sub-band there is derived a reduced bandwidth control signal whose magnitude is representative of the amplitudes of its associated high-frequency components. Since the total bandwidth of both the unmodified base band and the reduced bandwidth control signals is about 1,200 cycles per second, this invention reduces the 3,600 cycles per second bandwidth of a telephone quality speech signal by a factor of one-third.

The unmodified base band and the control signals are transmitted over a reduced bandwidth transmission channel to a receiver station, where synthetic speech is reconstructed from the transmitted base band and control signals. Since the band of high-frequency components into which this invention divides telephone quality speech signals contains important speech information, the high-frequency components must be accurately reconstructed at the receiver station in order to preserve the intelligibility and the naturalness of the original signal.

This invention attains the required degree of accuracy by providing a separate excitation signal of uniform amplitude and of the proper frequency for the reconstruction of each sub-band of high-frequency components: higher order. harmonics are generated from the base band at the receiver station; the harmonics are divided into subbands corresponding in frequency to the sub-bands into which the high-frequency components are divided at the transmitter station; and each sub-band of harmonics is made uniform in amplitude to form a separate excitation signal. The amplitude of each excitation signal is then adjusted by the proper control signal to reconstruct each of the sub-bands of high-frequency components, and a highly intelligible, natural sounding replica of the original speech signal is synthesized by combining all of the reconstructed high-frequency sub-bands with the unmodified base band.

Figure 2:
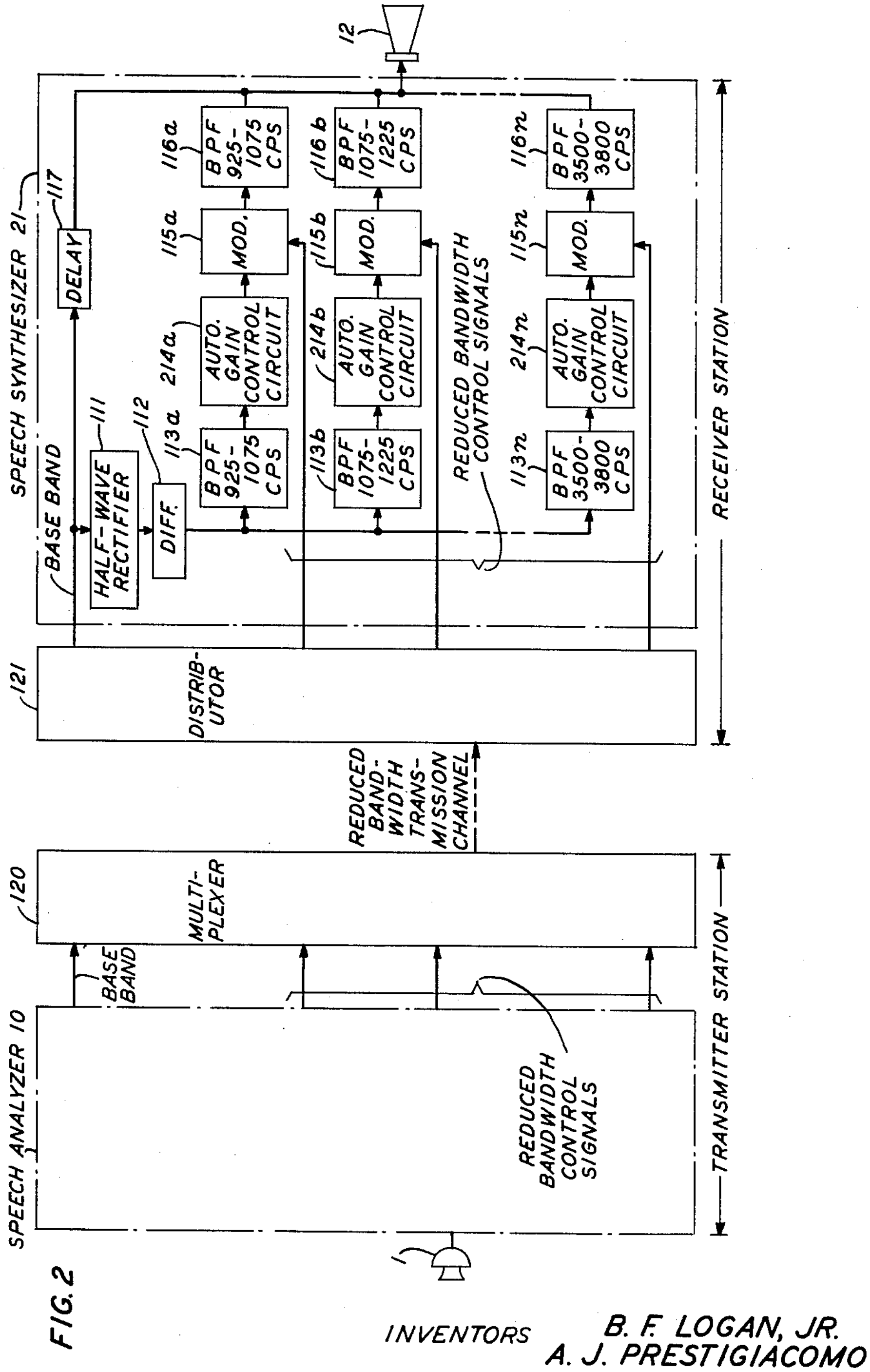

The invention will be fully understood from the following detailed description of an illustrative embodiments thereof taken in connection with the appended drawings, in which:

FIG. 1 is a schematic block diagram showing apparatus for transmitting telephone quality speech signals over a reduced bandwidth channel with a negligible loss of intelligibility or naturalness; and FIG. 2 is a block schematic diagram showing apparatus alternative to that of FIG. 1.

Referring now to FIG. 1, there is shown a source of telephone quality speech signals, for example, a telephone transmitter 1, which may be of any conventional construction. A 3,600 cycles per second bandwidth speech signal originating in the telephone transmitter is applied in parallel to band-pass filter 100 and to band-pass filters 100*a* through 100*n* of speech analyzer 10. The pass bands of filter 100 and filters 100*a* through 100*n* are chosen to divide the speech signal into a relatively narrow band of low-frequency components, and a relatively wide band of high-frequency components, respectively. The lower limit of the relatively narrow band of low-frequency components, or base band, is set at the highest low-frequency cut-off point of commercial telephone circuits, approximately 250 cycles per second, and the upper limit is set at a frequency that will insure that the base band contains accurate information regarding the fundamental pitch frequency of a wide range of typical human voices; for example, the upper limit is set at about 925 cycles per second. The relatively wide band of high-frequency components extends from 925 cycles per second to 3,800 cycles per second, and filters 100*a* through 100*n* subdivide this relatively wide band into a number of contiguous sub-bands whose bandwidths are sufficiently small to define with accuracy the individual high-frequency components of the speech signal; for example, the contiguous sub-bands from 925 cycles per second to 3,000 cycles per second may have constant bandwidths of 150 cycles per second, while the contiguous sub-bands from 3,000 cycles per second to 3,800 cycles per second may have somewhat broader bandwidths to produce a total of approximately $n=15$ sub-bands of high-frequency components. To the output terminal of each band-pass filter 100*a* through 100*n* there is connected a half-wave rectifier, 101*a* through 101*n*, followed by a low-pass filter, 102*a* through 102*n*, where the cut-off frequency of each low-pass filter is about 25 cycles per second. The output signal of each low-pass filter is a reduced bandwidth control signal whose instantaneous magnitude is representative of the instantaneous amplitudes of the high-frequency components in its associated sub-band. The total bandwidth of the base band and the reduced bandwidth control signals is on the order of 1,200 cycles per second, representing a one-third reduction of the 3,600 cycles per second bandwidth of the original signal from telephone transmitter 1. By suitably multiplexing the base band and the control signals in a conventional multiplexer 120, the speech signal originating in transmitter 1 may be transmitted in modified form over a reduced bandwidth transmission channel, as indicated in FIG. 1. Before multiplexing, however, the base band output of filter 100 is passed through a conventional delay element, illustrated by elements 103 of analyzer 10, to compensate for the delay introduced by low-pass filters 102*a* through 102*n* in deriving the group of reduced bandwidth control signals from the high-frequency components of the speech signal.

At the receiver station, the multiplexed signals are separated by a suitable distributor 121, and the base band is applied in parallel to half-wave rectifier 111 and to delay element 117 of speech synthesizer 11, while the control signals are applied to the control terminals of modulators 115*a* through 115*n* of synthesizer 11. The base band serves two purposes: it furnishes a group of excitation signals for reconstruction of the high-frequency components of the original speech signal; and it is combined with the reconstructed high-frequency components to form a replica of the original speech signal.

To derive the group of excitation signals, the base band is passed through half-wave rectifier 111 followed by differentiator 112, both of which may be of any well-known design. Rectifier 111 generates higher order harmonics of the fundamental speech frequency from the base band of low-frequency components, and differentiator 112 removes the direct-current component and helps to equalize the amplitudes of the harmonics. The differentiated harmonics, however, cannot be used directly as excitation signals, since their amplitudes are generally not equal, as required for the synthesis of highly intelligible, natural sounding speech. Excitation signals of uniform amplitudes are obtained by applying the differentiated harmonics in parallel to a bank of band-pass filters 113*a* through 113*n*, whose pass bands are identical with the pass bands of filters 100*a* through 100*n* of analyzer 10. Filters 113*a* through 113*n* thus divide the differentiated harmonics into sub-bands identical in frequency with the sub-bands into which the band of high-frequency components is subdivided at the transmitter station. Each sub-band of harmonics from filters 113*a* through 113*n* is passed to an infinite clipper 114*a* through 114*n*, respectively, and each infinite clipper, which may be of any desired sort, generates from the components of each sub-band a rectangular wave of uniform amplitude which serves as an excitation signal for the reconstruction of one of the sub-bands of high-frequency components of the original speech signal.

If desired, however, a bank of automatic gain control circuits may be used instead of infinite clippers 114*a* through 114*n* to generate a uniform amplitude excitation signal from each harmonic sub-band, as illustrated in FIG. 2. The automatic gain control circuits 214*a* through 214*n* are of conventional construction and are made sufficiently fast-acting to follow both the rate of variation of the harmonic amplitudes and the rate of variation of the speech sound level of a wide variety of talkers. It is to be understood, however, that whereas an infinite clipper of the type shown in FIG. 1 generates a rectangular wave regardless of the number of harmonic components contained in a harmonic sub-band, the shape of the excitation signal generated by an automatic gain control circuit of the variety illustrated in FIG. 2 depends upon the number of harmonic components contained in the preceding harmonic sub-band. When a harmonic sub-band contains only one harmonic component, the associated automatic gain control circuit generates a pure sine wave with a uniform peak amplitude; when a harmonic sub-band contains two or more harmonics, the associated automatic gain control circuit generates a sinusoidal wave whose envelope has a uniform peak amplitude.

Referring back to FIG. 1, each excitation signal is applied to the input terminal of one of the conventional modulators 115*a* through 115*n*, and each of the reduced bandwidth control signals from distributor 121 is applied to the control terminal of one of the modulators. The control signals adjust the amplitudes of the excitation signals, and the amplitude-adjusted excitation signals are filtered by band-pass filters 116*a* through 116*n*, which have pass bands identical with filters 100*a* through 100*n* of analyzer 10, to reconstruct the high-frequency sub-bands of the original speech signal. A replica of the original speech signal is synthesized by combining the reconstructed high-frequency sub-bands with the delayed base band output of element 117, where the delay of the base band is made equal to the delay introduced in the reconstruction of the high-frequency sub-bands. The synthesized speech is converted into highly intelligible, natural sounding speech by reproducer 12, for example, a conventional telephone receiver.

It is to be understood that the above-described arrangements are merely illustrative of applications of the principles of the invention. Numerous other arrangements may be devised by those skilled in the art without departing from the spirit and scope of the invention.

What is claimed is:

1. Apparatus for the reduced bandwidth transmission of speech signals which comprises a source of a speech signal, means for dividing said speech signal into a relatively narrow band of selected low-frequency components and a relatively wide band of selected high-frequency components, means for deriving from said band of high-frequency components a plurality of reduced bandwidth control signals representative of a corresponding plurality of selected sub-bands of said band of high-frequency components, means for transmitting said band of low-frequency components of said speech signal and said control signals to a receiver station, and, at said receiver station, means for generating from said band of low-frequency components of said speech signal a plurality of sub-bands of higher order harmonics of said low-frequency components to form a plurality of uniform amplitude excitation signals in one-to-one correspondence with said control signals, said sub-bands of higher order harmonics corresponding in frequency to said sub-bands of high-frequency components represented by said control signals, means for individually adjusting the amplitude of each of said excitation signals in response to the corresponding one of said control signals to reconstruct said selected sub-bands of high-frequency components of said speech signal, and means for combining said low-frequency components of said speech signal with said reconstructed sub-bands of high-frequency components to synthesize a replica of said speech signal.

2. Apparatus for transmitting a telephone quality speech signal over a reduced bandwidth channel with a negligible loss of intelligibility or naturalness which comprises a source of a telephone quality speech signal, means for dividing said speech signal into a narrow band of selected low-frequency components and a wide band of selected high-frequency components, means for deriving from said band of high-frequency components a plurality of reduced bandwidth control signals representative of the amplitudes of a corresponding plurality of selected sub-bands of said band of high-frequency components, means for transmitting said band of low-frequency components of said speech signal and said plurality of control signals to a receiver station, and, at said receiver station, means for generating from said band of low-frequency components of said speech signal a band of higher order harmonics of the fundamental frequency component of said speech signal, means for dividing said band of higher order harmonics into a plurality of sub-bands of harmonics corresponding in frequency to said sub-bands of high-frequency components of said speech signal represented by said control signals, means for making uniform the amplitudes of said sub-bands of harmonics, means responsive to said control signals for individually adjusting the amplitudes of said sub-bands of harmonics to reconstruct replicas of said sub-bands of high-frequency components, and means for combining said band of low-frequency components with said replicas of said sub-bands of high-frequency components to synthesize a replica of said speech signal.

3. Apparatus as defined in claim 2 wherein said means for making uniform the amplitudes of said sub-bands of harmonics comprises a plurality of automatic gain control circuits in one-to-one correspondence with said sub-bands of harmonics, in which said automatic gain control circuits are sufficiently fast-acting to follow both the rate of variation of the harmonic amplitudes and the rate of variation of the speech sound level of a wide variety of talkers.

4. In a speech synthesizing system, the combination that comprises a source of a narrow band of low-frequency components of a speech signal, a source of reduced bandwidth control signals representative of the amplitudes of sub-bands of high-frequency components of said speech signal, means for generating from said low-frequency components higher order harmonics of said low-frequency components of said speech signal, means for dividing said higher order harmonics into a plurality of uniform amplitude sub-bands corresponding in frequency to said high-frequency sub-bands of said speech signal represented by said control signals, means under the influence of said control signals for individually adjusting the amplitude of each of said corresponding uniform amplitude sub-bands to reconstruct replicas of said high-frequency sub-bands of said speech signal, and means for combining said low-frequency components of said speech signal with said replicas of said high-frequency sub-bands of said speech signal.

5. Apparatus for synthesizing speech from a narrow band of low-frequency components of a speech signal and from reduced bandwidth control signals representative of the amplitudes of sub-bands of high-frequency components of said speech signal which comprises, means for generating from said low-frequency components a band of higher order harmonics of the fundamental frequency of said speech signal, means for differentiating said band of higher order harmonics, means for dividing said differentiated band of high order harmonics into a plurality of sub-bands which are in one-to-one correspondence with said sub-bands of high-frequency components, means for making uniform the amplitudes of said sub-bands of differentiated higher order harmonics, means under the influence of said control signals for adjusting the amplitudes of said sub-bands of uniform amplitude harmonics, and means for combining said low-frequency components with said sub-bands of amplitude-adjusted harmonics.

6. Apparatus as defined in claim 5 wherein said means for making uniform the amplitude of each sub-band of differentiated harmonics comprises a plurality of infinite clippers in one-to-one correspondence with said sub-bands of differeniated harmonics.

7. In a system for the reduced bandwidth transmission of speech signals, apparatus for synthesizing speech from a relatively narrow band of low-frequency components of an original speech signal and a plurality of reduced bandwidth control signals representative of the amplitudes of a corresponding plurality of selected sub-bands of high-frequency components of said original speech signal which comprises, means for deriving from said relatively narrow band of low-frequency components of said speech signal a plurality of higher order harmonics of the fundamental frequency of said speech signal, means for dividing said plurality of higher order harmonics into a plurality of sub-bands of harmonics corresponding in frequency to said plurality of selected sub-bands of high-frequency components represented by said plurality of control signals, means for making uniform the amplitudes of each of said plurality of sub-bands of harmonics to develop a corresponding plurality of uniform amplitude excitation signals, means for modulating each of said excitation signals with a corresponding one of said control signals to reconstruct each of said selected sub-bands of high-frequency components of said speech signal, and means for combining said reconstructed sub-bands of high-frequency components and said narrow band of low-frequency components to synthesize a replica of said speech signal.

References Cited in the file of this patent

UNITED STATES PATENTS 2,098,956 Dudley ---------------- Nov. 16, 1937
3,030,450 Schroeder -------------- Apr. 17, 1962

FOREIGN PATENTS 1,079,118 Germany -------------- Apr. 7, 1960